US008644207B1

(12) United States Patent
Vivanco et al.

(10) Patent No.: US 8,644,207 B1
(45) Date of Patent: Feb. 4, 2014

(54) MIXED CARRIER COMMUNICATION CHANNEL MANAGEMENT

(75) Inventors: Daniel Vivanco, Reston, VA (US); Aik Chindapol, Washington, DC (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 263 days.

(21) Appl. No.: 13/213,652

(22) Filed: Aug. 19, 2011

(51) Int. Cl.
*H04H 20/71* (2008.01)
*H04W 4/00* (2009.01)

(52) U.S. Cl.
USPC ............ 370/312; 370/232; 370/328; 370/334

(58) Field of Classification Search
USPC .............. 370/312, 313, 328, 332, 334, 230.1, 370/232, 235, 319, 480, 482, 464
See application file for complete search history.

(56) References Cited

U.S. PATENT DOCUMENTS

2006/0209870 A1* 9/2006 Lee et al. ...................... 370/432
2011/0128903 A1* 6/2011 Futaki et al. .................. 370/312
2012/0039252 A1* 2/2012 Damnjanovic et al. ....... 370/328

OTHER PUBLICATIONS

D. Rhee, J. H. Kwon, H. W. Hwang, and K. S. Kim, "Prediction based adaptive modulation and coding on multipath Rayleigh fading channels based on channel prediction," In Proc. IEEE ICACT, Phoenix Park, Korea, Feb. 2006, vol. 1.*

* cited by examiner

*Primary Examiner* — Abdullah Riyami
*Assistant Examiner* — Brian Cox

(57) ABSTRACT

Active devices in communication with an access node of the wireless communication system through a mixed carrier are determined. Based on determined channel conditions, a determined RF load, and a determined load ratio of the at least one mixed carrier, a modulation and coding scheme and a frequency band are selected. Using the selected modulation and coding scheme and frequency band, a mixed broadcast is transmitted on the mixed carrier.

18 Claims, 7 Drawing Sheets

MIXED CARRIER COMMUNICATION CHANNEL MANAGEMENT

TECHNICAL BACKGROUND

Multimedia Broadcast and Multicast Services (MBMS) is a point-to-multipoint service in which data is transmitted from a single source to multiple destinations over a communication network. In a typical MBMS transmission, feedback from a wireless device about the channel environment is not available. Lacking such information, networks typically default to communicating with all wireless devices in a service area using a relatively low modulation and coding scheme (MCS) (such as QPSK modulation with code rate ½) at a relatively low frequency (such as 800 MHz). The lack of feedback to an access node from wireless devices thus leads to inefficient utilization of radio resources.

Overview

Systems and methods of communicating with a wireless device are provided. In one embodiment, active devices in communication with an access node of the wireless communication system through a mixed carrier are determined. Based on determined channel conditions, a determined RF load, and a determined load ratio of the at least one mixed carrier, a modulation and coding scheme and a frequency band are selected. Using the selected modulation and coding scheme and frequency band, a mixed broadcast is transmitted on the mixed carrier.

DETAILED DESCRIPTION

In operation, active wireless devices in communication with an access node through a mixed carrier are determined. Based on determined channel conditions, a determined spectrum allocation, a determined radio frequency (RF) load and a determined load ratio of the at least one mixed carrier, a modulation and coding scheme (MCS) and a frequency band are selected, and a mixed broadcast is broadcast on the mixed carrier using the selected MCS and frequency band.

Figure 1:
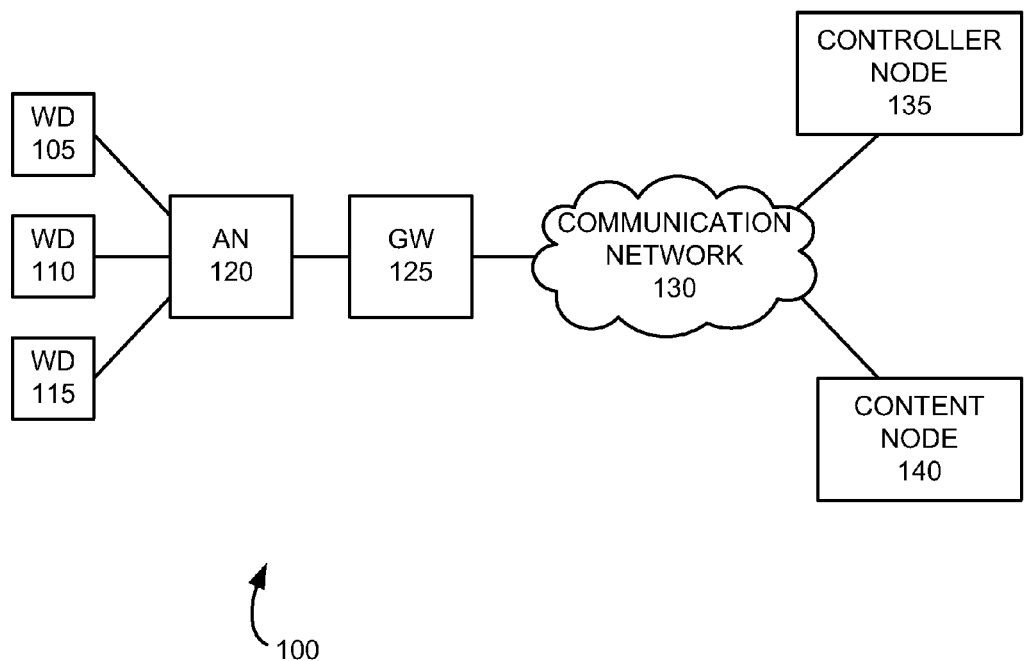
FIG. 1 illustrates an exemplary wireless communication system.

FIG. 1 illustrates an exemplary wireless communication system 100 comprising wireless devices 105, 110 and 115, access node 120, gateway 125, communication network 130, controller node 135, and content node 140. Other network elements may be present in the communication system 100 to facilitate wireless communication but are omitted for clarity, such as additional base stations, base station controllers, gateways, mobile switching centers, dispatch application processors, and location registers such as a home location register or visitor location register. Other network elements may also be present to facilitate communication between the controller node 135, the content node 140, the communication network 130, the gateway 125 and the access node 120 which are omitted for clarity, including additional processing nodes, routers, gateways, and physical and/or wireless data links for carrying data among the various network elements.

Examples of a wireless device 105, 110 and 115 include a cell phone, a smart phone, a computing platform such as a laptop, palmtop, or tablet, a personal digital assistant, an internet access device, or other device capable of wireless communication, including combinations thereof. Access node 120 communicates with the wireless devices 105, 110 and 115, and can be, for example, a base transceiver station or an eNodeB device. Gateway 125 is a network element in communication system 100, and can be, for example, an access service network (ASN) gateway. Communication network 130 is a network or internetwork and is in communication with the gateway 125. Controller node 135 is a network node which permits the wireless devices 105, 110 and 115 to register with and communicate through a communication system, and is in communication with the communication network 130. Content node 140 is a network node which stores and provides digital content upon request, and is in communication with the communication network 130. Content stored on content node 140 can be used, for example, in a mixed broadcast which is broadcast by the communication system and received by wireless devices 105, 110 and 115.

The wireless devices 105, 110 and 115, the access node 120, the gateway 125, the communication network 130, and the controller node 135 and the content node 140 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

With reference to FIG. 1, in operation, active wireless devices (such as wireless devices 105, 110 and 115) in communication with an access node (such as access node 120) through a mixed carrier are determined. Based on determined channel conditions, a determined spectrum allocation, a determined RF load and a determined load ratio of the at least one mixed carrier, a modulation and coding scheme (MCS) and a frequency band are selected, and a mixed broadcast is broadcast on the mixed carrier using the selected MCS and frequency band.

Figure 2:
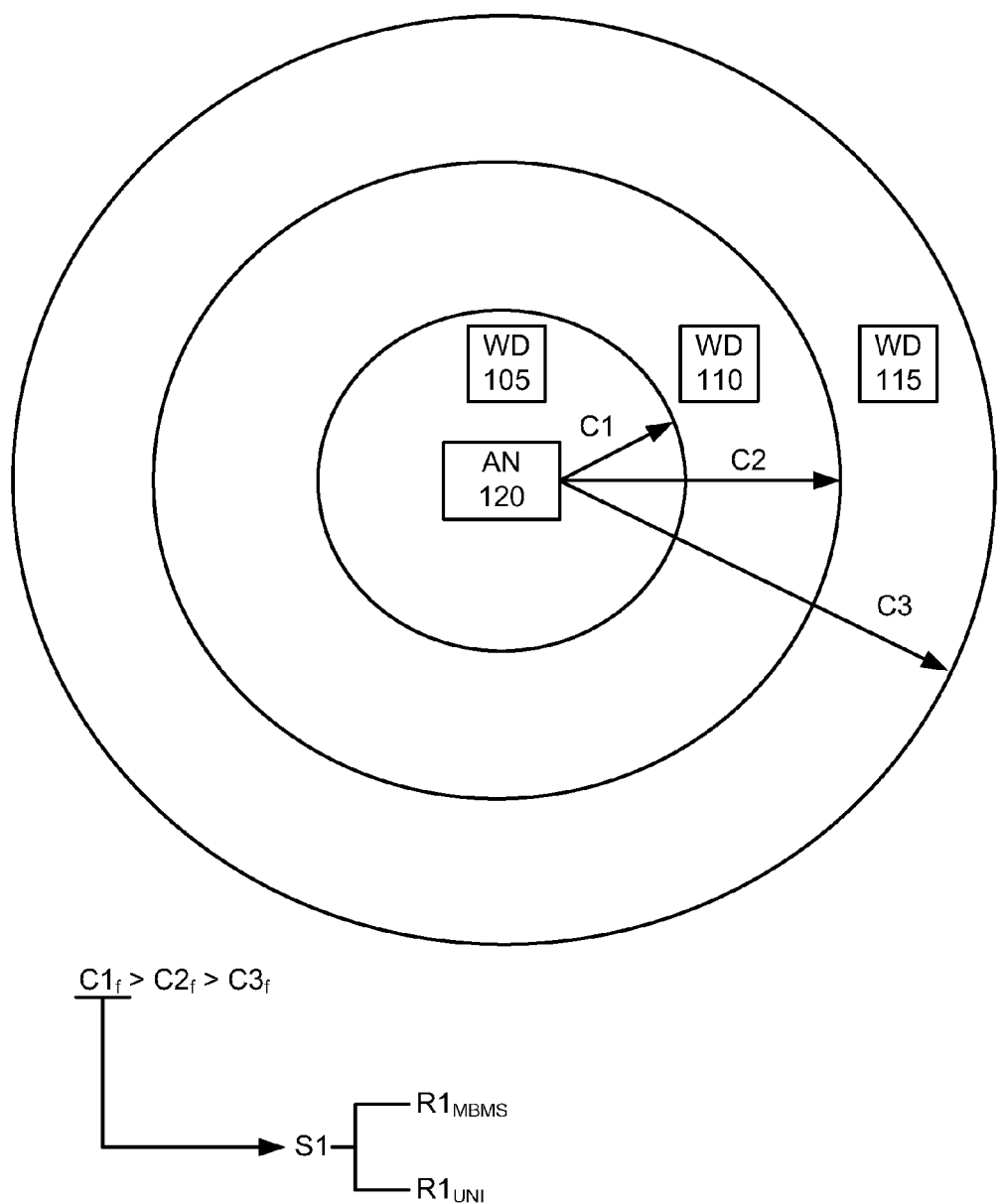
FIG. 2 illustrates an exemplary coverage area of an access node.

FIG. 2 illustrates an exemplary coverage area of an access node 120 in communication with three wireless devices 105, 110, and 115, which are located at different distances from the access node 120. Access node 120 can broadcast on numerous carriers, such as carriers C1, C2 and C3. In an example, C1 is a 2500 MHz carrier, C2 is a 1900 MHz carrier, and C3 is an 800 MHz carrier. On each carrier, access node 120 can employ various modulations schemes, such as QPSK, 16QAM, and 64QAM, each with varying error correction coding. A multi-frequency network (MFN) is capable of providing network access through more than one frequency band. Each channel may have different characteristics, including coverage, availability, total capacity, and transmission schemes.

In a typical MBMS transmission, for example, a 4G MBMS transmission, feedback from a wireless device about the channel environment, such as a channel quality indicator/information (CQI) report, an acknowledgement/negative acknowledgement (ACK/NACK), or reference signal received power (RSRP) is not available. As a result, network operators typically default to communicating with all wireless devices in a coverage area using a relatively low MCS (such as QPSK½) at a relatively low frequency (such as 800 MHz). The lack of feedback to an access node from wireless devices leads to radio resources being used inefficiently due in part to the inability to adjust the transmission when providing a MBMS in a service area.

Conversely, proper channel and MCS selection permits the provision of efficient wireless communications for MBMS over an advanced multi-frequency network even at great distances from an access node site. As described above, a dedicated carrier can be used to deliver MBMS. However, a dedicated MBMS carrier cannot be used to provide unicast or point-to-point communication. Thus, a mixed-carrier scheme can be employed, where no specific carrier is reserved for MBMS, and both unicast and MBMS communications are conducted over a carrier. A carrier which provides services for both MBMS and unicast data is referred to herein as a mixed carrier.

An access node may transmit more than one mixed carrier. For example, carriers C1, C2 and C3 of access node 120 can each be mixed carriers carrying both MBMS and unicast data traffic. Each channel may have different characteristics, including coverage, availability, total capacity, and transmission schemes. The spectrum resources (S) of each carrier (C) can thus be allocated among MBMS and unicast traffic. For example, carrier C1 has spectrum resources Si that can be allocated to MBMS ($R1_{MBMS}$) and unicast ($R1_{UN1}$), and thus the carrier C1 has an load ratio of $R1_{MBMS}$: $R1_{UN1}$. Similar allocations of resources can be made and load ratios determined for carriers C2 and C3.

Figure 3:
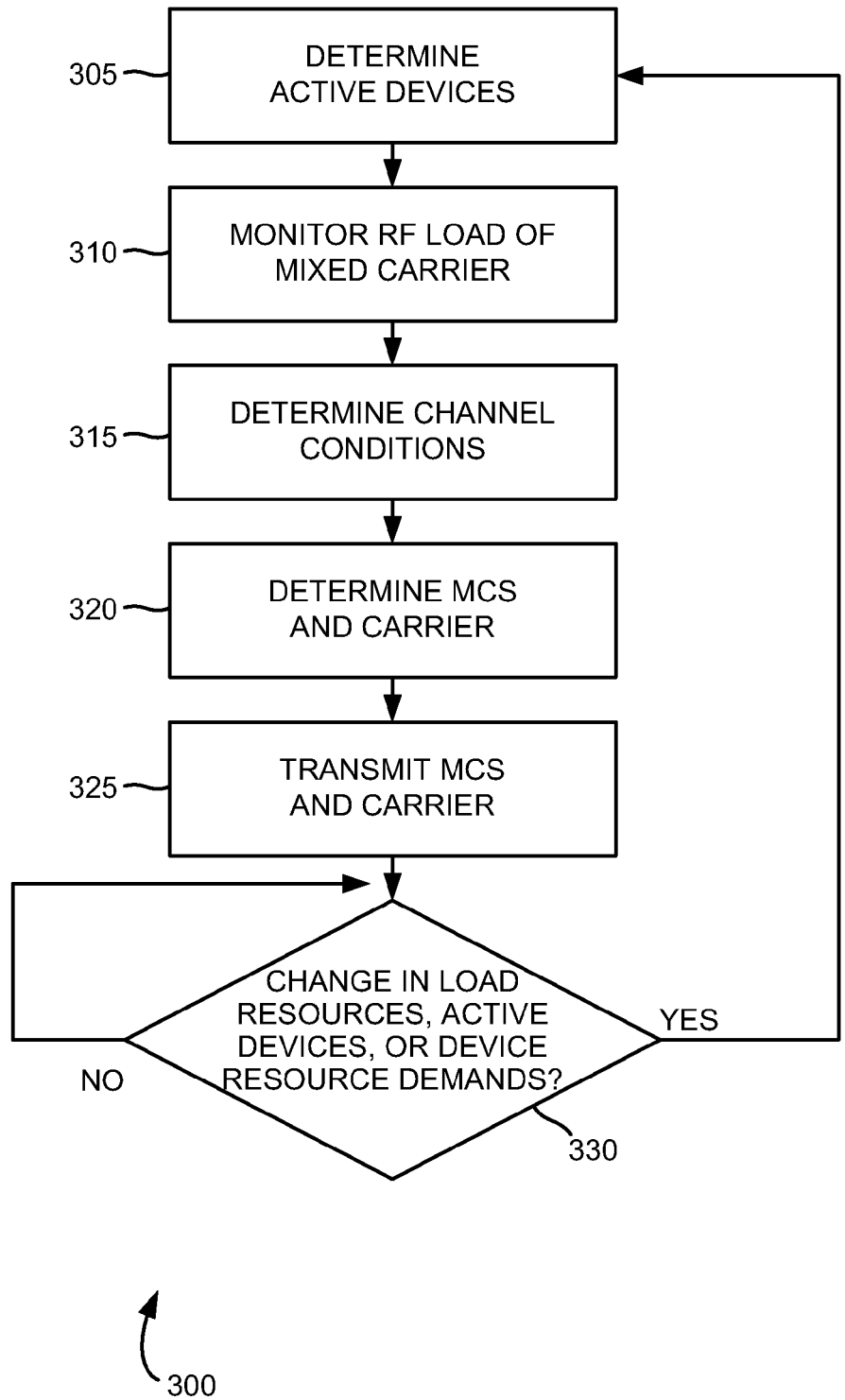
FIG. 3 illustrates an exemplary method of communicating with a wireless device in a wireless communication system.

FIG. 3 illustrates an exemplary method 300 of communicating with a wireless device in a wireless communication system. In operation 305, the active devices (such as wireless devices 105, 110 and 115) in communication with an access node (such as access node 120) through a mixed carrier are determined. In determining the active devices, the MCSs which each active device is capable of receiving is also determined. In operation 310, the RF load of the mixed carrier is monitored. For example, the access node 120 can monitor demand on RF resources in the coverage area on the mixed carrier or carriers of the access node 120, which can include a demand on resources requested by a wireless device in the coverage area.

In operation 315, the channel conditions of each carrier are determined. For example, each of the active devices (e.g., wireless devices 105, 110 and 115) in communication with the access node 120 can provide feedback to the access node about channel conditions. The feedback can be in the form of, for example, channel quality indicator/information (CQI) report, or an acknowledgement/negative acknowledgement (ACK/NACK), or reference signal received power (RSRP) information. Other forms of feedback are also possible. In an embodiment, the feedback is provided using unicast data. Based on the feedback, an estimated average channel quality can be determined based on, for example, aggregated statistical CQI values.

In operation 320, an MCS and a carrier are determined for a mixed carrier broadcast. The MCS and the carrier can be determined based on the RF load of the mixed carriers and the determined channel conditions. The MCS and the carrier are determined in order to balance the utilization of RF resources with meeting requirements of providing data service to the active devices in the access node coverage area. In an embodiment, the MCS and the carrier can be determined in order to satisfy a demand for MBMS services from a predetermined percentage of active devices in the coverage area rather than all of the active devices, whereby the selected MCS and carrier meet a demand threshold for the predetermined percentage of active devices. In such case, the remaining devices (i.e., the devices for which the MBMS service demand threshold is not met by the selected MCS and/or carrier) may receive MBMS services with intermittent unicast retransmissions to compensate for potentially poor service quality. In operation 325, the determined MCS and carrier are transmitted to the active devices, and data service is provided on the determined carrier using the determined MCS.

If there is change in the load resources, or in the active devices, or in the resource demands of the active devices (operation 330-YES), then the method can start again at operation 305 to reevaluate the changed condition. If there is no change in the load resources, or in the active devices, or in the resource demands of the active devices, provision of the data service continues on the determined MCS and carrier.

Figure 4:
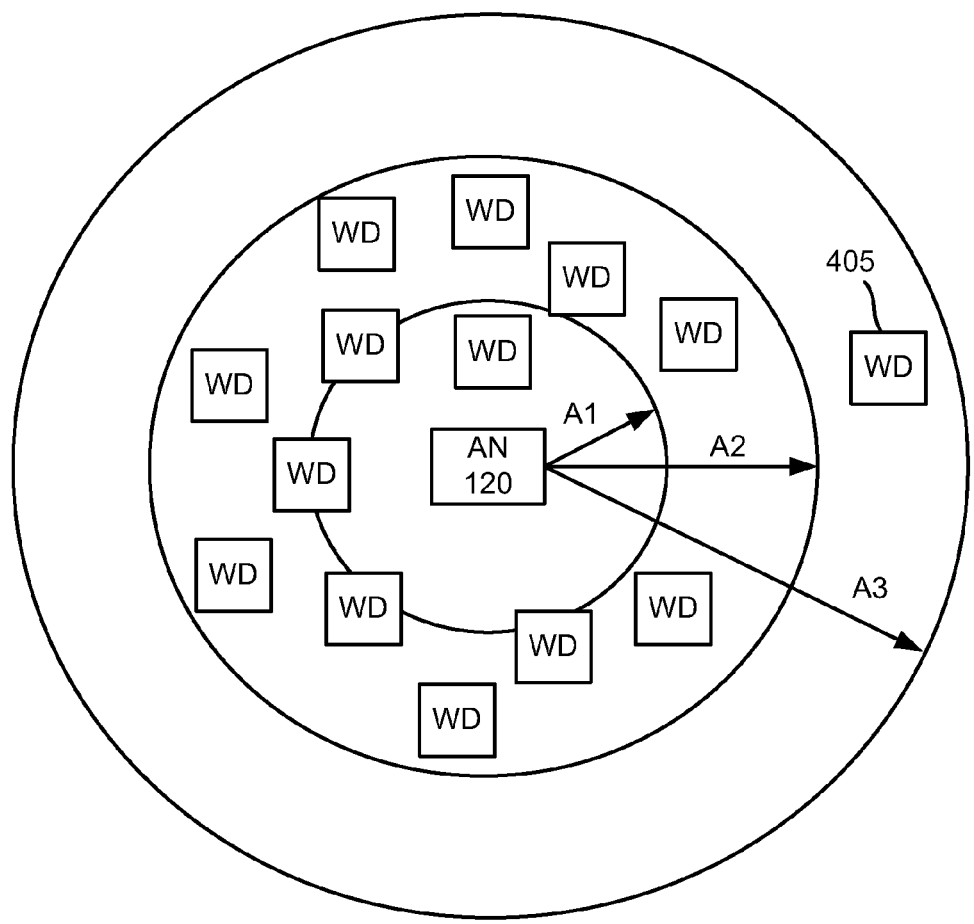
FIG. 4 illustrates another exemplary coverage area of an access node.

FIG. 4 illustrates another exemplary coverage area of an access node with a plurality of wireless devices in communication with the access node 120. Areas A1, A2 and A3 are within the coverage area of access node 120. In one example, wireless devices in area A1, close to the location of access node 120, can be provided service which meets the data needs of an MBMS transmission using 64QAM MCS. In addition, wireless devices in area A2 (which includes area A1), further from the location of access node 120, can be provided service which meets the data needs of an MBMS transmission using 16QAM MCS. Also, wireless devices in area A3 (which includes areas A1 and A2), still further from the location of access node 120, can be provided service which meets the data needs of an MBMS transmission using QPSK MCS.

The provision of an MBMS broadcast requires sufficient downlink throughput. If RF conditions permit, it is possible to use a MCS providing a relatively high data rate and using relatively low error correcting capability. In contrast, if RF conditions are poor, a higher error correcting capability but a relatively low data rate can be used, resulting in a relatively smaller downlink throughput but nevertheless as high as RF conditions permit.

As illustrated in FIG. 4, based on determined channel conditions, a determined spectrum allocation, a determined RF load and a determined load ratio of a mixed carrier, an MCS of 16QAM can be selected to deliver MBMS service to the majority of wireless devices in the coverage area of access node 120. Wireless device 405, outside of area A2, may not be able to receive the MBMS broadcast or correctly decode the MBMS due to poor signal quality and can alternatively receive MBMS with intermittent unicast transmissions sent, for example, with higher transmit power or higher error correcting capability to compensate for being unable to receive or decode the broadcast using 16QAM.

However, if a number of wireless devices were to move beyond area A2 (but within area A3), those wireless devices would also no longer be able to receive the MBMS broadcast, and would be forced to receive intermitted unicast transmissions in order to receive the broadcast. Based on the increased number of devices beyond area A2 (which, for example, could be expressed as a percentage of active devices), it can be determined that a new MCS will be selected, QPSK. The new MCS would be communicated to all of the active devices in the coverage area and the broadcast would continue using the new MCS. In addition, the decision to change to a new MCS can also be based on the RF resource overhead generated by the increased number of unicast retransmissions as wireless devices move beyond area A2.

Figure 5:
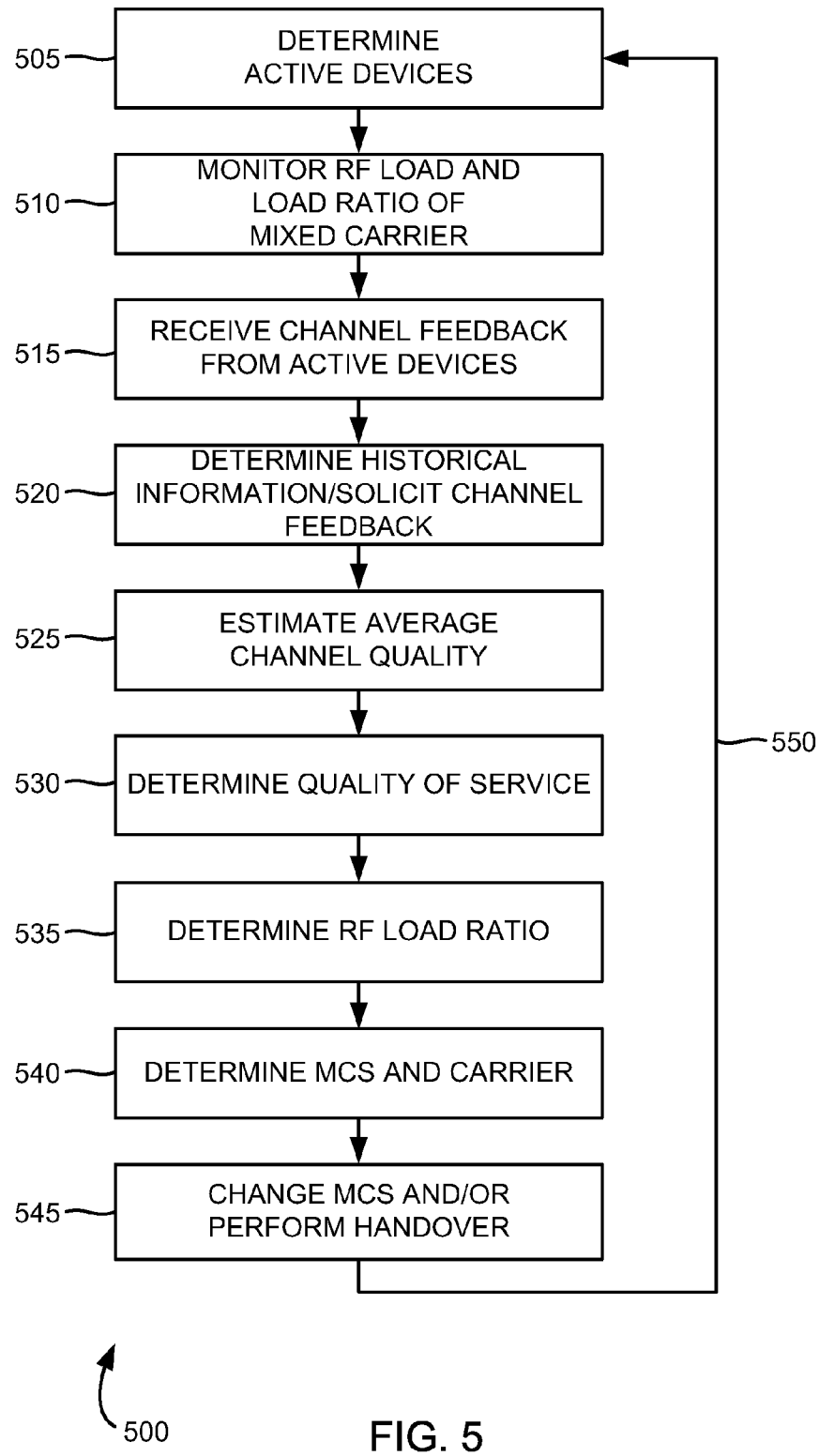
FIG. 5 illustrates another exemplary method of communicating with a wireless device in a wireless communication system.

FIG. 5 illustrates another exemplary method 500 of communicating with a wireless device in a wireless communication system. In operation 505, the active devices (such as wireless devices 105, 110 and 115) in communication with an access node (such as access node 120) through a mixed carrier are determined. In determining the active devices, the MCSs which each active device is capable of receiving are also determined. In operation 510, the RF load of the mixed carrier is monitored. For example, the demand on RF resources in the coverage area on the mixed carrier or carriers of the access node 120 can be monitored. In addition, the load ratio of MBMS and unicast traffic of the mixed carrier or carriers of the access node 120 can also be monitored.

In operation 515, the channel conditions of each carrier are determined. For example, each of the active devices (e.g., wireless devices 105, 110 and 115) in communication with the access node 120 can provide feedback to the access node about channel conditions. The feedback can be in the form of, for example, channel quality indicator/information (CQI) report, or an acknowledgement/negative acknowledgement (ACK/NACK), or reference signal received power (RSRP) information. Other forms of feedback are also possible. In an embodiment, the feedback is provided using unicast data.

In operation 520, in addition to, or as an alternative to, channel feedback from the active devices, historical information about the channel conditions can be determined. Historical information can be, for example, feedback about channel conditions received within a period of time. Historical information about channel conditions can be used together with more recent feedback from active devices to determine trends in channel conditions. Historical information about channel conditions can also be used as an alternative to more recent feedback from an active device, for example, if no feedback is received from a wireless device within a predetermined period of time. Historical information is typically used from active devices, and if a device is no longer an active device (for example, if a wireless device moves beyond the range of an access node, or is powered off) then historical information from that device may not be used.

If feedback is not received from a wireless device, feedback can be solicited from a wireless device using a unicast transmission. For example, if feedback is not received from a wireless device 115, access node 120 can be instructed to transmit a unicast request to wireless device 115 to solicit feedback about channel conditions.

In operation 525, based at least in part on the RF load and/or the load ratio of the mixed carrier, and the information about RF channel conditions, an estimated average channel quality can be determined. For example, information about RF channel conditions, an estimated average channel quality can be determined based on, for example, aggregated statistical CQI values.

In operation 530, a quality of service for the mixed carrier is determined. The quality of service can be based on, for example, quality of service requirements of at least some portion of the active devices (for example, a percentage), or it can be an average quality of service requirement of the active devices. The quality of service can also be an average of a portion of the highest quality of services requirements of the active devices, for example, an average quality of service requirement of the five or ten highest qualities of service required among the active devices.

In operation 535, a load ratio of the mixed channel is determined. For example, based on the coverage, availability, total capacity and available transmission schemes of the mixed carrier, the ratio of spectrum resources allocated to MBMS and to unicast traffic can be determined.

In operation 540, an MCS and a carrier are determined for a particular mixed carrier broadcast. The MCS and the carrier can be determined based on the RF load and load ratio of the mixed carriers and the determined channel conditions. The MCS and the carrier are determined in order to balance the utilization of RF resources with meeting requirements of providing data service to the active devices in the access node coverage area. In an embodiment, the MCS and the carrier can be determined in order to satisfy a large percentage of the active devices in the coverage area rather than all of the active devices. In such case, the remaining devices may receive MBMS service with intermittent unicast retransmissions to compensate for potentially poor service quality. The determined MCS and carrier are transmitted to the active devices. If the determined MCS or the determined carrier are different than a previous MCS or carrier, the active devices are instructed to change to the new MCS or carrier. Either or both of the determined MCS and carrier can be different from a previous MCS and carrier. In the case of a new carrier, the active devices will be handed over to the new carrier, which compared to changing to a new MCS creates more of a demand on radio resources, places more demands on each active device, and may create delay. In one example, a new MCS will be determined preferentially to determining a new carrier. Following the change to a new MCS and/or carrier, the active devices in communication with the access node can be determined and the RF load and load ratio of the mixed carrier can be monitored (operation 550).

Figure 6:
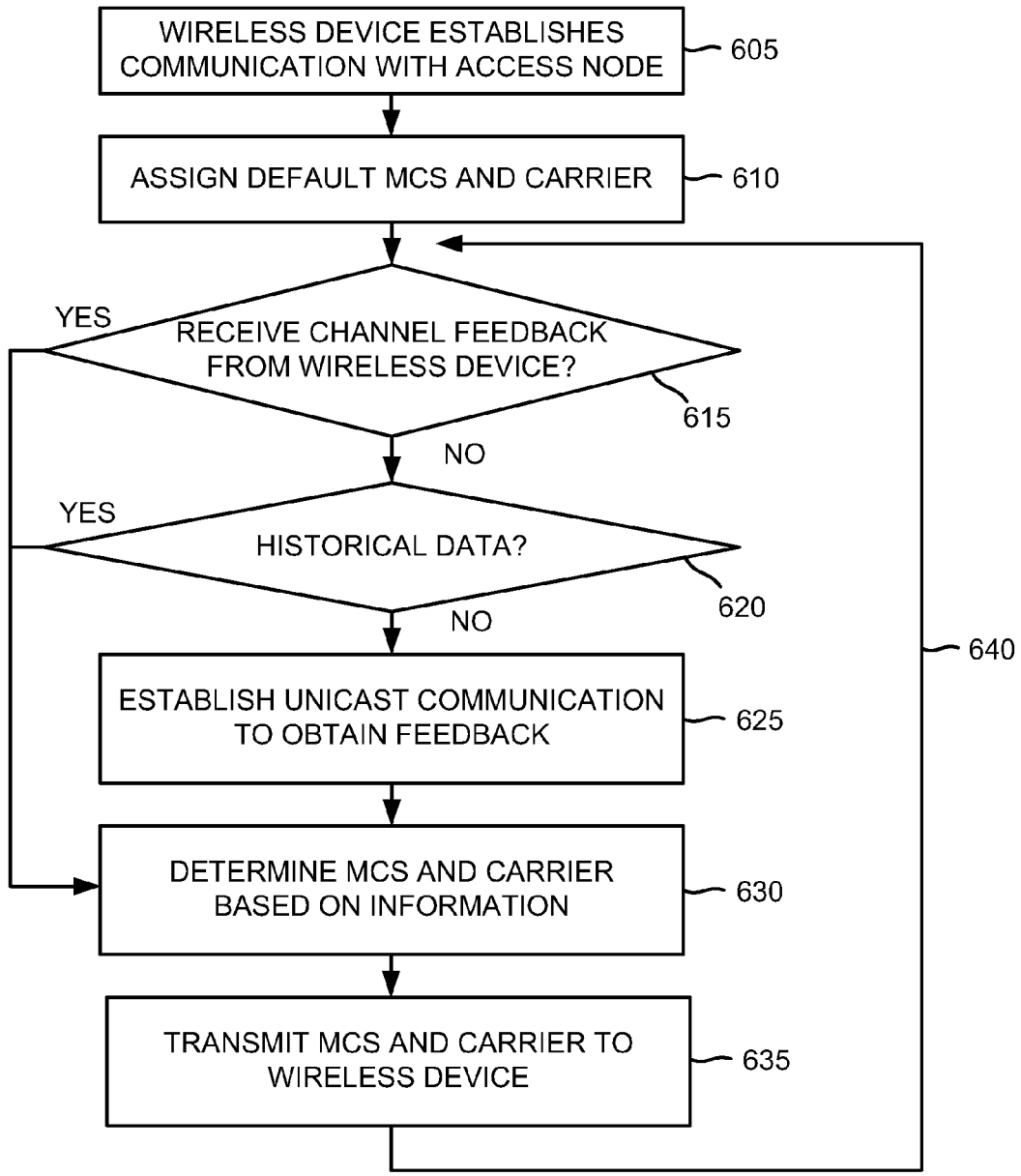
FIG. 6 illustrates another exemplary method of communicating with a wireless device in a wireless communication system.

FIG. 6 illustrates another exemplary method of communicating with a wireless device in a wireless communication system. In operation 605, a wireless device (such as a wireless device 105, 110 or 115) establishes communication with an access node (such as access node 120). For example, the wireless device may have been powered on in the coverage area, or the wireless device may have moved into the coverage area. In operation 610, a default MCS and carrier band are assigned to the wireless device. For example, a carrier band of 800 MHZ and an MCS of QPSK can be assigned to the wireless device.

In operation 615, it is determined whether feedback is received from the wireless device about the channel conditions. The feedback can be in the form of, for example, channel quality indicator/information (CQI) report, or an acknowledgement/negative acknowledgement (ACK/NACK), or reference signal received power (RSRP) information. Other forms of feedback are also possible. In an embodiment, the feedback is provided using unicast data.

If feedback about channel conditions is not received from the wireless device, it is determined whether there is historical information about channel conditions (operation 620). Historical information can be, for example, feedback about channel conditions received within a window of time. Historical information about channel conditions can be used together with more recent feedback from active devices to determine trends in channel conditions. Historical information about channel conditions can also be used as an alternative to more recent feedback from an active device, for example, if no feedback is received from a wireless device within a predetermined period of time.

In operation 625, if feedback is not received from a wireless device, and there is not historical information about channel conditions, feedback can be solicited from a wireless device using a unicast transmission. For example, if feedback is not received from a wireless device 115, access node 120 can be instructed to transmit a unicast request to wireless device 115 to solicit feedback about channel conditions.

In operation 630, an MCS and carrier for the wireless device is determined based on the feedback about channel conditions from operation 615, historical information about channel conditions in operation 620, or the solicited feedback from operation 625. The MCS and carrier can also be determined at least in part on the RF load and/or the load ratio of the mixed carrier, as well as an estimated average channel quality.

In operation 635 the determined MCS and carrier are transmitted to the wireless device, and in operation 640 the process loops back to the determination of whether feedback from the wireless device is received.

Figure 7:
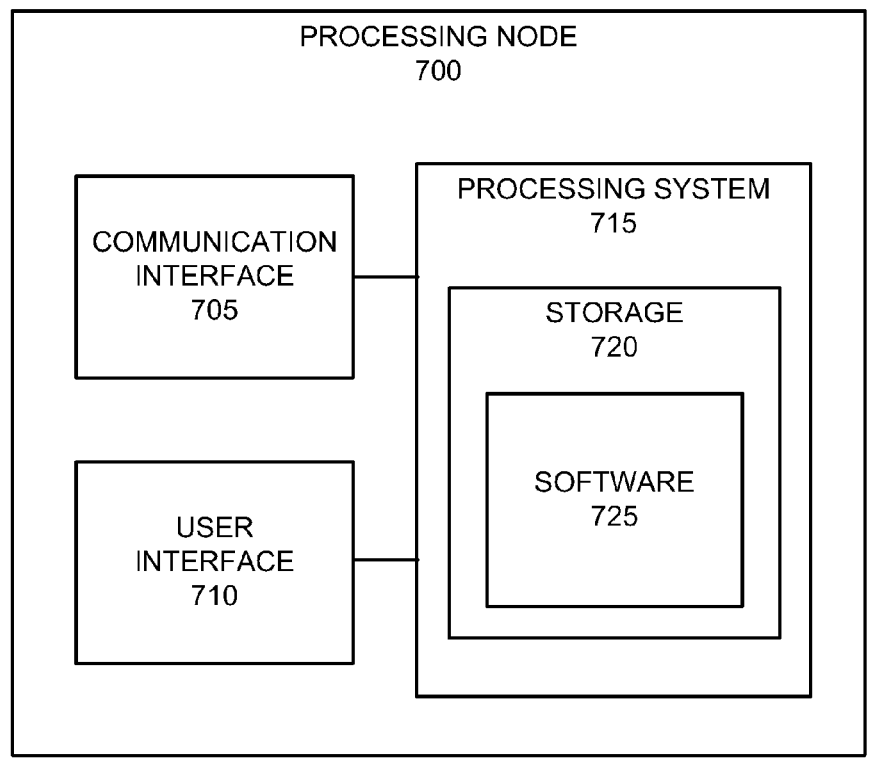
FIG. 7 illustrates an exemplary processing node.

FIG. 7 illustrates an exemplary processing node 700. Processing node 700 can be, for example, an access node or a gateway, or a component thereof, or it can be another network element (or a component of another network element) of a communication system. Processing node 700 can include a communication interface 705 and a user interface 710, each in communication with a processing system 715. Processing node 700 can communicate with other network elements, including mobile stations and other processing nodes, over a wired and/or wireless communication link through the communication interface 705.

Processing system 715 can include storage 720. Storage 720 comprises a disk drive, flash drive, memory circuitry, or other memory device. Storage 720 can store software 725 which is used in the operation of the processing node 700. Software 725 may include an operating system, utilities, drivers, network interfaces, applications, or some other type of software. Processing node 700 can also include a user interface 710 to permit a user to configure and control the operation of the processing node 700.

In operation, the processing system 715 of processing node 700 can determine active devices in communication with an access node of the wireless communication system through a mixed carrier, and select a modulation and coding scheme and a frequency band based on determined channel conditions, a determined RF load, and a determined load ratio of the at least one mixed carrier. Through the communication interface 705 the processing node 700 can also communicate the selected MCS and frequency band to broadcast a mixed broadcast on the mixed carrier using the selected MCS and frequency band.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of communicating with a wireless device in a wireless communication system, comprising:
    determining active devices in communication with an access node of the wireless communication system through a mixed carrier, wherein the mixed carrier comprises multimedia broadcast and multicast services (MBMS) traffic and unicast data;
    selecting a modulation and coding scheme (MCS) and a frequency band based on determined channel conditions, a determined RF load, and a determined load ratio of the at least one mixed carrier, wherein the load ratio comprises a ratio of carrier resources allocated to the MBMS traffic to carrier resources allocated to the unicast data; and
    broadcasting a mixed broadcast on the mixed carrier using the selected MCS and frequency band.

2. The method of claim 1, wherein determining active devices further comprises:
    determining active devices in communication with an access node of the wireless communication system through a mixed carrier using a unicast message.

3. The method of claim 1, wherein the determined channel conditions further comprise determined channel conditions based on channel feedback from the active devices.

4. The method of claim 3, wherein the channel feedback is one of channel quality indicators, acknowledgments/negative acknowledgments, and reference signal received powers.

5. The method of claim 3, wherein the determined channel conditions are based on historical information when channel feedback has not been received from the active devices.

6. The method of claim 5, wherein the determined channel conditions are further based on an estimated average channel quality based on the channel feedback or the historical information.

7. The method of claim 1, wherein the determined channel conditions are based on a message from an active device received in response to a unicast message sent to the active device.

8. The method of claim 1, further comprising:
    repeating the determining and the selecting when there is a change in the channel conditions, the spectrum allocation, or the determined RF load of the at least one mixed carrier.

9. The method of claim 1, wherein the selected MCS and the frequency band meet a demand threshold for MBMS services for a predetermined percentage of the determined active devices, and wherein active devices not within the predetermined percentage are provided MBMS service with an intermittent unicast retransmission.

10. A system for communicating with a wireless device in a wireless communication system, comprising:
    a processor configured to
        determine active devices in communication with an access node of the wireless communication system through a mixed carrier, wherein the mixed carrier comprises multimedia broadcast and multicast services (MBMS) traffic and unicast data, and
        select a modulation and coding scheme (MCS) and a frequency band based on determined channel conditions, a determined RF load, and a determined load ratio of the at least one mixed carrier, wherein the load ratio comprises a ratio of carrier resources allocated to the MBMS traffic to carrier resources allocated to the unicast data; and
    a communication interface to communicate the selected MCS and frequency band to broadcast a mixed broadcast on the mixed carrier using the selected MCS and frequency band.

11. The system of claim 10, wherein the processor is further configured to determine active devices in communication with an access node of the wireless communication system based on information obtained through a mixed carrier using a unicast message.

12. The system of claim 10, wherein the determined channel conditions further comprise determined channel conditions based on channel feedback from the active devices.

13. The system of claim 12, wherein the channel feedback is one of channel quality indicators, acknowledgments/negative acknowledgments, and reference signal received powers.

14. The system of claim 12, wherein the determined channel conditions are based on historical information when channel feedback has not been received from the active devices.

15. The system of claim 14, wherein the determined channel conditions are further based on an estimated average channel quality based on the channel feedback or the historical information.

16. The system of claim 10, wherein the determined channel conditions are based on a message from an active device received in response to a unicast message sent to the active device.

17. The system of claim 10, wherein the processor is further configured to:
    redetermine active devices and reselect an MCS and a frequency band when there is a change in the channel conditions, the spectrum allocation, or the determined RF load of the at least one mixed carrier.

18. The method of claim 10, wherein the processor is further configured to select the MCS and the frequency band to meet a demand threshold for MBMS service for a predetermined percentage of the determined active devices, and to provide active devices not within the predetermined percentage with MBMS service with an intermittent unicast retransmission.

* * * * *